United States Patent Office 2,867,530
Patented Jan. 6, 1959

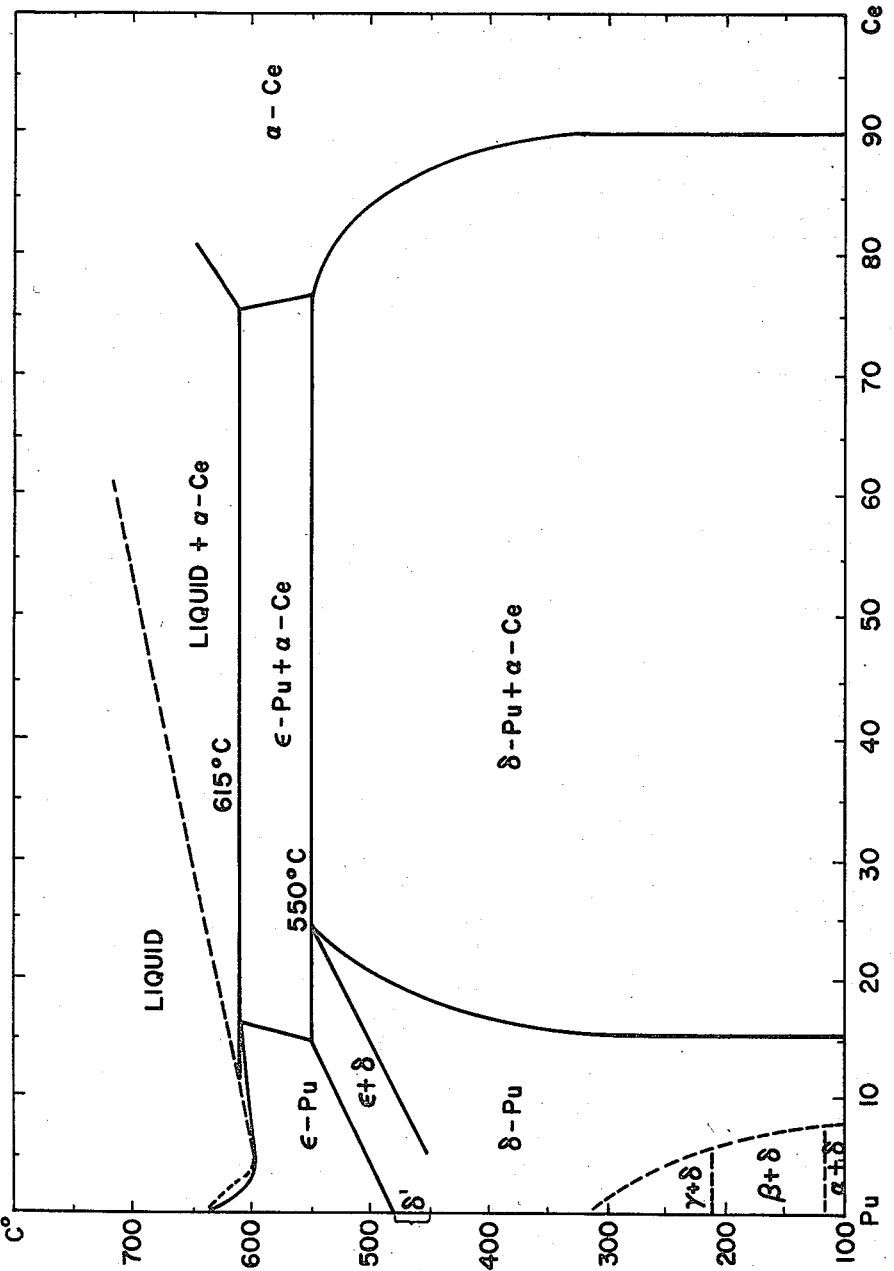

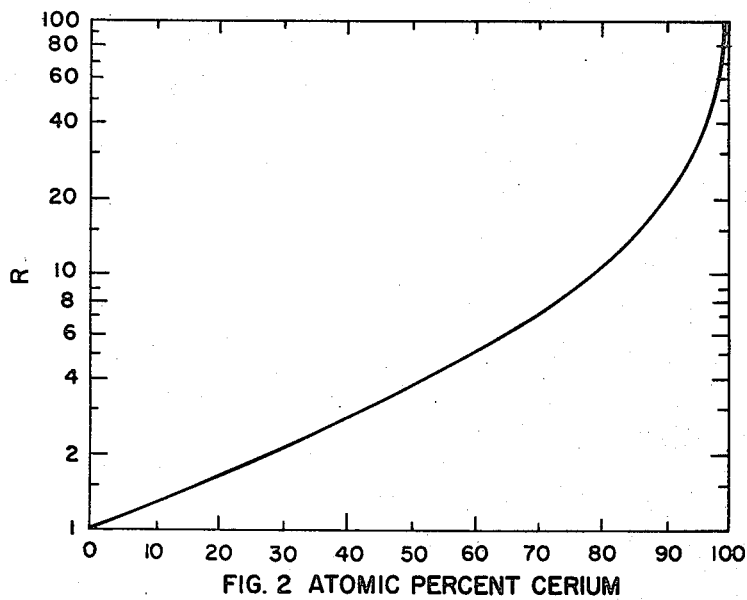
FIG. 2 ATOMIC PERCENT CERIUM
INVENTOR.
ARTHUR S. COFFINBERRY

2,867,530

PLUTONIUM-CERIUM ALLOY

Arthur S. Coffinberry, Los Alamos, N. Mex., assignor to the United States of America as represented by the United States Atomic Energy Commission Application August 29, 1957, Serial No. 681,149

2 Claims. (Cl. 75—122.7)

The present invention relates to alloys of plutonium and more specifically to alloys of plutonium which are useful in neutronic reactors as the fuel of such reactors.

Neutronic reactors have been constructed and operated in which the fuel element has been essentially pure plutonium. For example, such a reactor is the Los Alamos fast reactor known as "Clementine." Such reactors use a fairly small volume of fuel because of the great activity of pure plutonium and consequently the heat developed is also confined to a very small volume with the attendant difficulties of removing a large quantity of heat from a small volume. (This reactor is described in AEC LA-1679 available from TIS, Oak Ridge, Tenn.)

In a reactor using uranium for the fuel elements where the fuel is actually atoms of uranium of the isotope $U^{235}$, an expansion of the fuel volume is achieved by controlling the degree of enrichment of $U^{235}$ within a matrix of $U^{238}$ and this enrichment is achieved by limiting the degree of isotope separation of $U^{235}$. Since plutonium is produced as a pure material almost exclusive of any isotope other than $Pu^{239}$, this same automatic dilution is not achieved. Thus to gain the advantages of dispersed fuel it is necessary to add to the plutonium atoms some foreign element. The choice of a foreign element is not a matter which can be settled by the selection of almost any available metal because of the following strict requirements which are the least that must be met for reactor use. These are:

(1) A neutronic compatability with the system. The element must not be a strong absorber of neutrons in the energy range of the neutrons of the reactor system.

(2) It must improve the fabrication characteristics of plutonium. The element must produce an alloy which can be fabricated to fuel elements with considerable ease.

(3) It must alloy with plutonium readily. The element must alloy with plutonium readily so that the preparation of such an alloy is a simple metallurigical step.

(4) It must have reasonable radiation stability. As is well known, any fuel element subjected to a high flux of neutron and gamma rays will change its characteristics due to nuclear changes within the crystal structure of the element. Some materials exhibit a greater resistance to changes under these conditions than others.

It has been found that the metal cerium when alloyed with plutonium in a wide range of percentages will produce an alloy which meets the above stringent requirements.

It is therefore an object of this invention to provide an alloy of plutonium and cerium having good neutronic and fabrication characteristics.

It is a further object of this invention to provide an alloy of plutonium and cerium having good radiation resistant characteristics.

Further objects of this invention will be apparent from the following description and claims and Figures 1 and 2 hereby made a part of the specification in which Figure 1 shows a phase diagram of the plutonium-cerium system, and Figure 2 shows a computed curve of the increase in the amount of Pu needed for a critical mass of alloy.

The preferred embodiment of the present invention comprises an alloy system of plutonium and cerium consisting of from 2 to 90 atomic percent cerium and the balance plutonium.

Preparation

The alloys of the present invention are, in the preferred embodiment, prepared and cast in a vacuum. The constituents can be placed in a tantalum crucible in a vacuum furnace wherein a vacuum of the order of $10^{-4}$ mm. of Hg can be maintained throughout the melting and casting operations. Crucibles of magnesium oxide as produced by the method of co-pending application S. N. 597,829, filed July 13, 1956, Allison, can be used, for example. Before use, the crucibles are degassed at 1100 to 1200° C. to assure a high purity of the reactor fuel.

A suitable melting cycle consists of heating the alloying constituents above the melting point (as seen in Fig. 1) quite rapidly with an induction furnace of sufficient power to do so. The molten mixture is held at this temperature for about 15 minutes and then allowed to cool at the natural rate of the furnace (approximately 5°/min.). This procedure was found to be satisfactory for the production of all alloys claimed in the present invention.

If it is desired to cast alloys in a form other than the natural shape of the crucible, they can be cast when molten or may be cooled in the crucible, remelted and cast. Best homogeneity of the alloy is obtained by chill casting, i. e., very rapid freezing by casting into a water cooled copper mold. Castability of these alloys is excellent. The techniques used in casting pure aluminum are usually applicable to these alloys.

It has been found that an alloy containing about 15 percent or less cerium will, as cooled, contain its plutonium in the delta phase (see Fig. 1). The delta phase plutonium in this region is metastable and as the alloy undergoes considerable shock which might be produced by machining, for example, the plutonium will change to the alpha phase. This does not in any way affect the machining qualities of the alloy except possibly to improve them.

Properties of the alloys

As can be seen from the phase diagram of Figure 1 an alloy composed of from slightly above zero percent cerium to about 15 percent cerium consists of the delta phase plutonium in a metastable condition. From about 15 percent to about 90 percent cerium the alloy consists of a mixture of delta plutonium and alpha phase cerium.

The alloy in either the delta phase plutonium or the delta plutonium plus alpha cerium has good qualities for ease of fabrication for reactor fuel purposes. Its consistency is similar to lead and consequently the alloy may be extruded or pressed into desired shapes with considerable ease.

A great problem in reactor design is the selection of materials which can undergo high neutron flux bombardment without premature deleterious effects. A material which is relatively soft initially can withstand a large amount of neutron bombardment without becoming unusably brittle very quickly, as the material has a long range of hardness change to undergo before it becomes too brittle. The alloy of the present invention has this desirable characteristic since it is quite soft initially.

The nuclear properties of cerium are sufficiently excellent so that alloys containing up to 90 percent cerium may be used as a reactor fuel. Elements which absorb many neutrons in any manner would not be suitable for reactor fuel in this large a percentage. When plutonium is alloyed with another element, there is an increase in the amount of plutonium needed for a critical mass of alloy. This increase depends on the volume occupied by the alloy and the neutronic characteristics of the alloying element. Since plutonium is a very expensive metal, it is desirable to keep the increase in plutonium as low as possible. If we designate a ratio R as $$R = \frac{\text{wt. of Pu in a critical mass of alloy}}{\text{wt. of critical mass of unalloyed Pu}}$$

it can be seen that a perfect but unobtainable ratio would be unity for all alloys. Thus it is important to keep R as close to unity as possible. Cerium is an excellent element for keeping R low, as can be seen in Figure 2. Most elements have an R considerably above cerium for any given percentage.

General considerations

When an alloy of the present invention contains a considerable amount of cerium the mass of alloy required in a given neutronic reactor for the same reactivity conditions will, of course, be a great deal higher than pure plutonium. This, as has been stated, can be a desired advantage in reactor design primarily because the volume of material in which the heat of the reactor is born is considerably greater and the ease of removing such heat is equally easier. Furthermore, thermal conductivity and fabricability of the alloy are better than pure plutonium. If the plutonium-cerium alloy is used in a reactor such as "Clementine," the number of fuel rods will be increased in an amount which can be determined by methods well known in the art. In that particular design the added fuel rods can be placed in a volume gained by using fewer uranium rods within the fuel cage. In other reactors currently being designed elsewhere, to which reference can be found in the literature, the fuel cavity can usually be designed to accommodate the fuel volume for the plutonium-cerium alloys without any radical change in design.

It should be noted that existing neutronic reactors do not operate at temperatures above 550° C. and that the alloy of the present invention when used as a solid fuel material should not be operated through a temperature above 550° C. if the alloy contains from about 15 atomic percent cerium to about 80 atomic percent cerium. The reason for this is that at 550° C. in this percent cerium range, the delta phase transforms to the epsilon phase with a sudden change in volume. In a reactor, a sudden change in volume is undesirable.

As can be seen in the phase diagram of Figure 1, the specification discloses alloys of plutonium and cerium in the range of zero to 100 percent cerium. However, the beneficial effects of cerium become noticeable at about 5 percent cerium and although the fabrication advantages exist up to 100 percent cerium, the nuclear considerations require that a fuel for a nuclear reactor have not more than 90 percent cerium with the balance plutonium.

Therefore the present invention is not limited by the foregoing specification, but only by the following claims which recognize the variations within the spirit of this invention, which may be developed by exercising skill in the art.

What is claimed is:

1. An alloy for a neutronic reactor fuel consisting essentially of from 5 to 90 atomic percent cerium and the balance plutonium.

2. An alloy for a neutronic reactor fuel for operation below 550° C. consisting essentially of from about 15 to about 80 atomic percent cerium and the balance plutonium.

No references cited.